US010892981B2

(12) United States Patent
Ceccarelli et al.

(10) Patent No.: US 10,892,981 B2
(45) Date of Patent: Jan. 12, 2021

(54) METHOD AND APPARATUS FOR SEGMENT ROUTING AND RSVP-TE ROUTING IN TRANSPORT SDN NETWORKS

(71) Applicant: Telefonaktiebolaget LM Ericsson (publ), Stockholm (SE)

(72) Inventors: Daniele Ceccarelli, Sollentuna (SE); Massimiliano Maggiari, Pleasanton, CA (US); Paolo Rebella, Bergeggi (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 138 days.

(21) Appl. No.: 16/302,738

(22) PCT Filed: May 20, 2016

(86) PCT No.: PCT/EP2016/061497
§ 371 (c)(1),
(2) Date: Nov. 19, 2018

(87) PCT Pub. No.: WO2017/198319
PCT Pub. Date: Nov. 23, 2017

(65) Prior Publication Data
US 2019/0280960 A1 Sep. 12, 2019

(51) Int. Cl.
H04L 12/721 (2013.01)
H04L 12/717 (2013.01)

(52) U.S. Cl.
CPC .......... H04L 45/123 (2013.01); H04L 45/124 (2013.01); H04L 45/34 (2013.01); H04L 45/42 (2013.01)

(58) Field of Classification Search
CPC ....... H04L 45/123; H04L 45/42; H04L 45/34; H04L 45/124
See application file for complete search history.

(56) References Cited

U.S. PATENT DOCUMENTS

2015/0249593 A1* 9/2015 Alvarez .............. H04L 41/0803
370/241
2016/0021000 A1* 1/2016 Previdi .................. H04L 45/507
370/392

OTHER PUBLICATIONS

Alcatel-Lucent, Segment Routing and Path Computation Element—Using traffic engineering to optimize path placement, White Paper, Oct. 5, 2015 (Year: 2015).*

(Continued)

Primary Examiner — Shailendra Kumar
(74) Attorney, Agent, or Firm — Coats + Bennett, PLLC

(57) ABSTRACT

A method for routing packet traffic through a network comprising a plurality of network nodes supporting RSVP-TE protocol and Segment Routing protocol. Each of the two protocols is associated with a separate set of labels, the method comprises calculating (202) a path through the network; checking support (204) for both protocols at nodes along the calculated path and encoding (206) the calculated path as a set of Adjacency Segment Identifiers. The method also comprises optimising (208) a label stack of the calculated path by substituting more than one adjacency SIDs with a node SID if a partial path identified by the substituted adjacency SIDs equals a shortest path. If all nodes along the calculated path support label stack depth equal to or deeper than the optimised label stack (210) then segment routing is used to set up the path. If a node along the calculated path does not support a label stack depth equal to or deeper than the depth of the optimised label stack (210) then an Explicit Route Object is used for signalling the calculated path using RSVP-TE (214).

18 Claims, 6 Drawing Sheets

(56) References Cited

OTHER PUBLICATIONS

Khatri, P., "Segment Routing", A tutorial, Feb. 1, 2016, pp. 1-80, Nokia, Apricon 2016, Arnic 41.
Alcatel-Lucent, "Segment Routing and Path Computation Element", Technology White Paper, Feb. 13, 2015, pp. 1-28, retrieved on Feb. 7, 2017, retrieved from internet: https://www.tmcnet.com/tmc/whitepapers/documents/whitepapers/2015/11525-segment-routing-path-computation-element-using-traffic-engineering.pdf.
Anonymous, "Program APRICOT", Feb. 15, 2016, Workshops agenda, retrieved on Feb. 7, 2017, retrieved from internet: https://2016.apricot.net/41/program.html#agenda.
Li, Z. et al., "Tunnel Segment in Segment Routing", Presentation, IETF 95, Buenos Aires, Argentina, Apr. 5, 2016, pp. 1-16, retrieved on Nov. 16, 2018, retrieved from internet: https://datatracker.ietf.org/meeting/95/materials/slides-95-spring-5.
Cisco Systems, Inc., "Segment Routing Configuration Guide for Cisco ASR 9000 Series Routers, IOS XR Release 6.1.x", Sep. 1, 2015, pp. 1-84, Cisco Systems, Inc.
Tantsura, J. et al., "Signaling Maximum SID Depth using Border Gateway Protocol Link-State", IDR Working Group Internet-Draft, Jul. 6, 2015, pp. 1-5, IETF.

\* cited by examiner

METHOD AND APPARATUS FOR SEGMENT ROUTING AND RSVP-TE ROUTING IN TRANSPORT SDN NETWORKS

TECHNICAL FIELD

The present invention relates to communications networks, in general, and in particular to a method and an apparatus for using RSVP-TE and Segment Routing for controlling of routing of packet traffic.

BACKGROUND

Segment routing is a technique to manage connection in IP and IP/MPLS domains described in *Segment Routing Architecture, IETF draft: draft-ietf-spring-segment-routing-07*. SR architecture leverages on a per-flow source routing paradigm: for each flow, the ingress node inserts in the packet header an ordered list of instructions, called segments, on how the packet has to be treated by other nodes of the SR (Segment Routing) domain. SR is an emerging technology that applies both to IP and MPLS networks and can be run both in distributed control plane environment (i.e. IP/MPLS control plane) and in centralized control plane environment (i.e. Transport SDN). Segment is an identifier for various instructions and it can identify a service, an IGP-based (IGP=Interior Gateway Protocol) or BGP-based (BGP=Border Gateway Protocol) forwarding construct, a context, a locator and others. Segments are represented with 32-bit field called Segment Identifier (SID). The main benefit of using SR is that it allows routing and managing paths in packet domains in a simpler and more scalable way. The simplicity and scalability of routing and management in SR is possible thanks to the following characteristics:

Only the ingress node is aware of the state of the flow, while other transit and egress nodes only process the packet according to its header. With other technologies like RSVP the state is maintained by each node involved in the path. This characteristic of segment routing is advantageous for network tomography because it allows controlling the route the packet will follow.

Signalling protocol (RSVP, LDP) is no longer needed. Only routing protocol (like OSPF, IS-IS, etc) is used to distribute SID information in the SR domain.

Segment routing leads to reduction of databases (e.g. signalling databases) of up to two orders of magnitude and simplification of the router architecture.

In addition, SR allows performing existing IP and IP/MPLS procedures (like fast reroute, ECMP, TE paths) in a flexible and faster way that makes the solution suitable for SDN scenario.

In Segment Routing, the term segment identifier (SID) is equivalent to the term label known in MPLS in case the data plane is MPLS. In this document both terms are used interchangeably.

Existing technology based on segment routing (SR) as defined by the IETF draft document mentioned earlier is a network technology that provides enhanced packet forwarding behaviour while minimizing the need for maintaining awareness of mass volumes of network state. SR satisfies essential requirements for application-enabled routing in software defined networks, including the ability to provide strict network performance guarantees, efficient use of network resources and very high scalability for application-based transactions. Segment routing is based on two concepts: Node Segment and Adjacency Segment.

A node segment is a segment allocated to a loopback that identifies a specific node. It is globally significant so it must be unique among nodes. In the example illustrated in FIG. 1, 15003 is the node segment of router R. This means it is a segment allocated to a loopback of router R and a packet injected at any node in the network with top segment 15003 will reach router R by the shortest-path.

Adjacency Segment represents the local interface to a specific SR node, it is locally significant (i.e. don't have to be unique among nodes) and it is used to steer traffic onto an adjacency or a set of adjacencies. An adjacency segment is signalled by IS-IS or OSPF.

In the example shown in FIG. 1, router B allocates a segment 20004 and maps it to its link B-F and advertises the adjacency segment in IGP, but it is only the router B that installs this adjacency segment in a FIB (forwarding information base). Then any packet received by router B with segment 20004 will be routed via the link B-F.

RSVP-TE is a well consolidated signalling protocol that is used to setup LSPs (Label Switched Paths) in MPLS and GMPLS networks. RSVP-TE installs a path state using a RESV message on all nodes of LSPs and is used to program the FIBs (forwarding information base). Since each node is capable of swapping the top most label of a label stack, it is possible with a single label to build arbitrary long LSPs. The issue with RSVP is the scalability, due to the fact that states need to be constantly refreshed.

Although RSVP-TE is the most commonly used signalling protocol for Traffic Engineering in MPLS and GMPLS networks it has some disadvantages:

It is extremely complex to configure and operate due to a high number of parameters to be configured and objects/messages to be managed.

It has scalability issues. It works very well in networks with a moderate number of LSPs where the number of states to refresh on each node is not causing a huge overhead in terms of the number of messages exchanged and processing capabilities.

If a node goes down for a while the states are deleted and the signaling needs to be performed again.

One of the main reasons for the definition of Segment Routing is to overcome the limitations of RSVP-TE, and it partially succeeded since it is totally stateless and there is no PATH or RESV state to refresh on the nodes and the intermediate nodes can switch the MPLS frames simply using the info included into the MPLS label itself. A RESV message stores the RESV state and is sent from the receiver to the sender host along the reverse data path. At each node the IP destination address of the RESV message will change to the address of the next node on the reverse path and the IP source address to the address of the previous node address on the reverse path. A PATH message is sent from a sender host along the data path and stores the PATH state in each node along the path. The path state includes the IP address of the previous node, and additional data objects related to the sender. The ingress node is provided with the full list of MPLS labels to be used for the forwarding and the intermediate nodes simply need to forward the MPLS frame as it is or POP the topmost label. However, segment routing is not perfect either and its main problem is the Label Stack depth. Most of the existing nodes support a very limited number of labels in the MPLS stack (typically 4-5). This is not a big issue in non-Traffic Engineered networks, in which the Node SID can be used to identify the domain border node and the routing within each domain is done accordingly to the SPF (shortest path first). The label stack depth becomes a more concrete problem in the case of Traffic Engineered networks, where typically a label is needed for each hop (to identify the Adjacency SID). For this application limiting TE-LSPs (Traffic Engineered Label Switched Paths) to 4-5 hops is a serious issue.

SUMMARY

It is the object of the present invention to obviate at least some of the above disadvantages and provide an improved method and devices for routing packets based on RSVP-TE and Segment Routing.

Accordingly, the invention seeks to preferably mitigate, alleviate or eliminate one or more of the disadvantages mentioned above singly or in any combination.

According to a first aspect of the present invention there is provided a method for routing packet traffic through a network. The network comprises a plurality of network nodes, wherein the nodes support RSVP-TE protocol and Segment Routing protocol and each of these two protocols is associated with a separate set of labels. The method comprises calculating a path through the network, checking support for both protocols at nodes along the calculated path and encoding the calculated path as a set of Adjacency Segment Identifiers. The method also comprises optimising a label stack of the calculated path by substituting more than one adjacency SIDs with a node SID if a partial path identified by the substituted adjacency SIDs equals a shortest path. If all nodes along the calculated path support label stack depth equal to or deeper than the depth of the optimised label stack then the calculated path is setup using segment routing and the optimised label stack, whereas, if a node along the calculated path does not support a label stack depth equal to or deeper than the depth of the optimised label stack then an Explicit Route Object is used for signalling the calculated path using RSVP-TE.

According to a second aspect of the present invention there is provided a controller for controlling routing of packet traffic through a network. The network comprises a plurality of network nodes, wherein the nodes support RSVP-TE protocol and Segment Routing protocol and each of the two protocols is associated with a separate set of labels. The controller comprises a processor and a memory, said memory contains instructions executable by said processor whereby said controller is operative to calculate a path through the network, check support for both protocols at nodes along the calculated path and encode the calculated path as a set of Adjacency Segment Identifiers. Said controller is further operative to optimise a label stack of the calculated path by substituting more than one adjacency SIDs with a node SID if a partial path identified by the substituted adjacency SIDs equals a shortest path; and if all nodes along the calculated path support label stack depth equal to or deeper than the depth of the optimised label stack then the controller is operative to setup the calculated path using segment routing and the optimised label stack, whereas, if a node along the calculated path does not support a label stack equal to or deeper than the depth of the optimised label stack then the controller is operative to use an Explicit Route Object for signalling the calculated path using RSVP-TE.

According to a third aspect of the present invention there is provided a controller for controlling routing of packet traffic through a network. The network comprises a plurality of network nodes, wherein the nodes support RSVP-TE protocol and Segment Routing protocol and each of the two protocols is associated with a separate set of labels. The controller comprises calculating means for calculating a path through the network, means for checking support for both protocols at nodes along the calculated path and encoding means for encoding the calculated path as a set of Adjacency Segment Identifiers. The controller further comprises optimising means for optimising a label stack of the calculated path by substituting more than one adjacency SIDs with a node SID if a partial path identified by the substituted adjacency SIDs equals a shortest path and means for setting-up the calculated path. If all nodes along the calculated path support label stack depth equal to or deeper than the depth of the optimised label stack then the means for setting-up the calculated path is operative to use segment routing and the optimised label stack for setting-up the calculated path, whereas, if a node along the calculated path does not support a label stack equal to or deeper than the depth of the optimised label stack then the means for setting-up the calculated path is operative to use an Explicit Route Object for signalling the calculated path using RSVP-TE.

Further features of the present invention are as claimed in the dependent claims.

BRIEF DESCRIPTION OF THE DRAWINGS

The present invention will be understood and appreciated more fully from the following detailed description taken in conjunction with the drawings in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary details.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

The solution disclosed in this document proposes in one of its embodiments to use a hybrid solution for MPLS transport SDN networks in which both RSVP-TE and Segment Routing are enabled on the nodes, the path computation is centralized and the Transport SDN controller, 800, 900, is the entity initiating the LSPs setup via PCEP. It also defines a procedure for migrating from an RSVP-TE network to a hybrid one and from a segment routing network to an hybrid one and a mechanism to manage the resulting hybrid network in a transport SDN environment. This allows mitigating the issues of each technology and exploiting the advantages of each of them.

The main reason for introducing Segment Routing in MPLS networks is to overcome the scalability issues of RSVP-TE. As mentioned, in networks with a large number of nodes and LSPs it is challenging to periodically refresh the RSVP-TE state on all the nodes. On the other hand, one of the drawbacks of segment routing is a limitation related to a limited depth of label stack that nodes in a network are able to process. Most of the nodes only support a limited number of labels stacked (typically four or five), which limits Traffic Engineering to relatively short paths.

Figure 1:
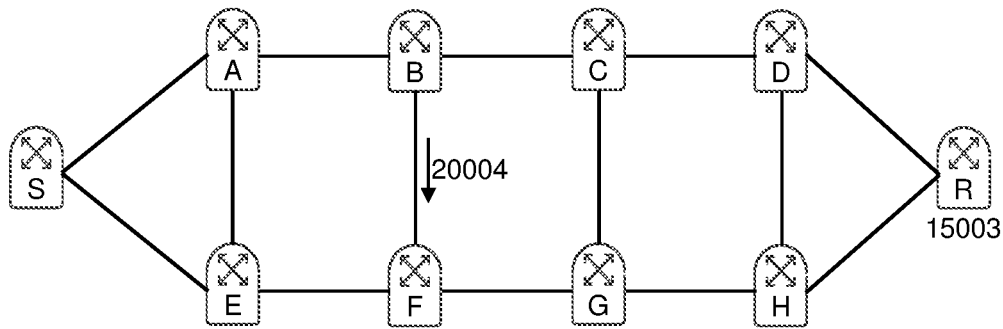
FIG. 1 is a diagram illustrating basic concepts of segment routing in a network.
Figure 2:
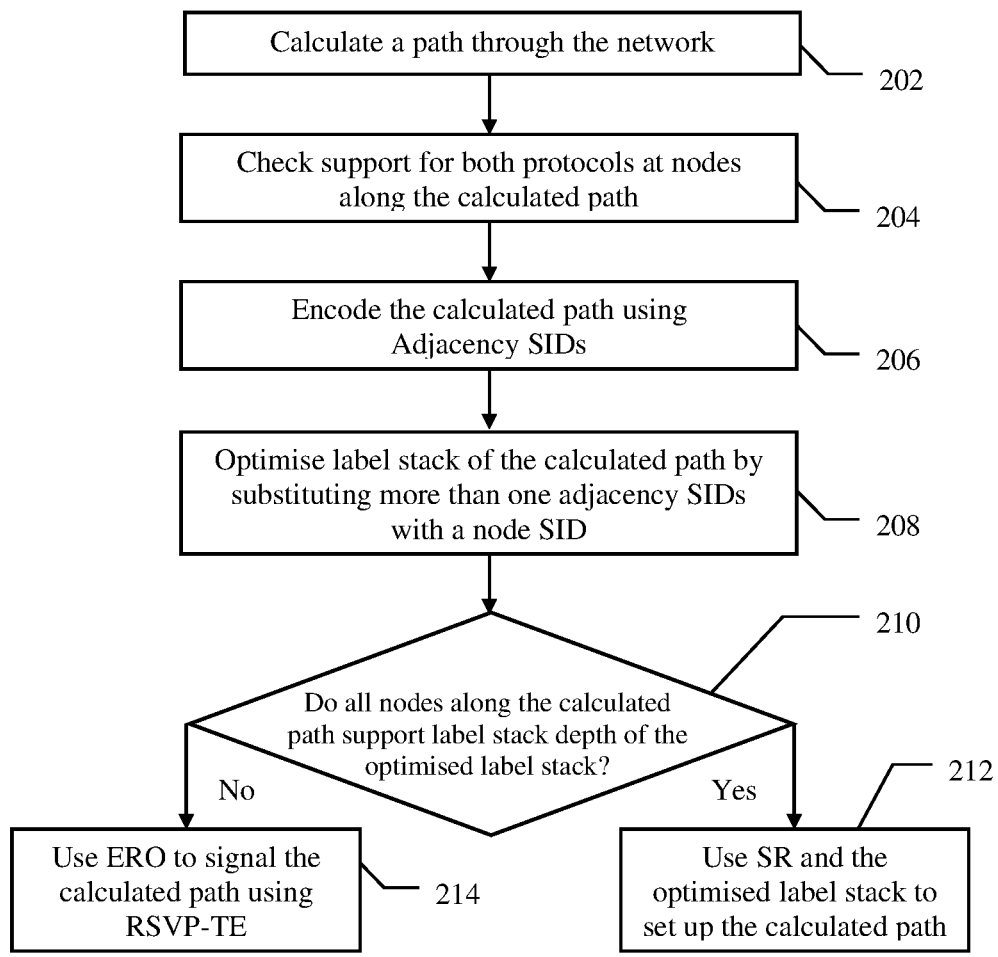
FIG. 2 is a flowchart illustrating a method for routing packet traffic through a network in one embodiment.

With reference to FIG. 2 an embodiment of a method for routing packet traffic through a network comprising a plurality of network nodes is illustrated. The nodes support RSVP-TE and Segment Routing. Such a hybrid controlled network can be a newly installed network with dual stack nodes (RSVP-TE and Segment Routing) or a network migrated to hybrid control. Each of the two protocols is associated with a separate set of labels. In a preferred embodiment the two sets of labels are organised as two ranges of labels, for example it may be that the range of labels from 1000 to 15000 is reserved for RSVP-TE and a range of labels from 15001 to 30000 is reserved for Segment Routing. In an alternative embodiment it may be that odd labels are reserved for RSVP-TE and even labels are reserved for SR. The advantage of the preferred embodiment is that it allows for more flexibility in dividing the labels between RSVP-TE and SR, for example 40% for RSVP-TE and 60% for SR, whereas the division odd/even allows only for 50/50 allocation.

In operation, when a new LSP (Label Switched Path) needs to be provisioned, the method comprises calculating, 202, a path through the network. In a preferred embodiment a Path Computation Element (PCE) (sometimes referred to as Path Calculation Element or Engine) computes this new path, wherein the PCE is implemented as part of an SDN controller, 800, 900. The PCE may be implemented in an SDN controller as a function operating in a processor or as a dedicated module. In an alternative embodiment the PCE may be implemented outside of the SDN controller. The new path may be a single domain path or it may span multiple domains. The next operation comprises checking support, 204, for both labels stacks at nodes along the calculated path. Preferably, the checks includes checking if both protocols are supported and checking the depth of the label stacks supported in Segment Routing at individual nodes. Alternatively, in a newly deployed network with dual stack nodes (RSVP-TE and SR) it may be that only the depth of the label stacks supported in SR at individual nodes is being checked.

Figure 4:
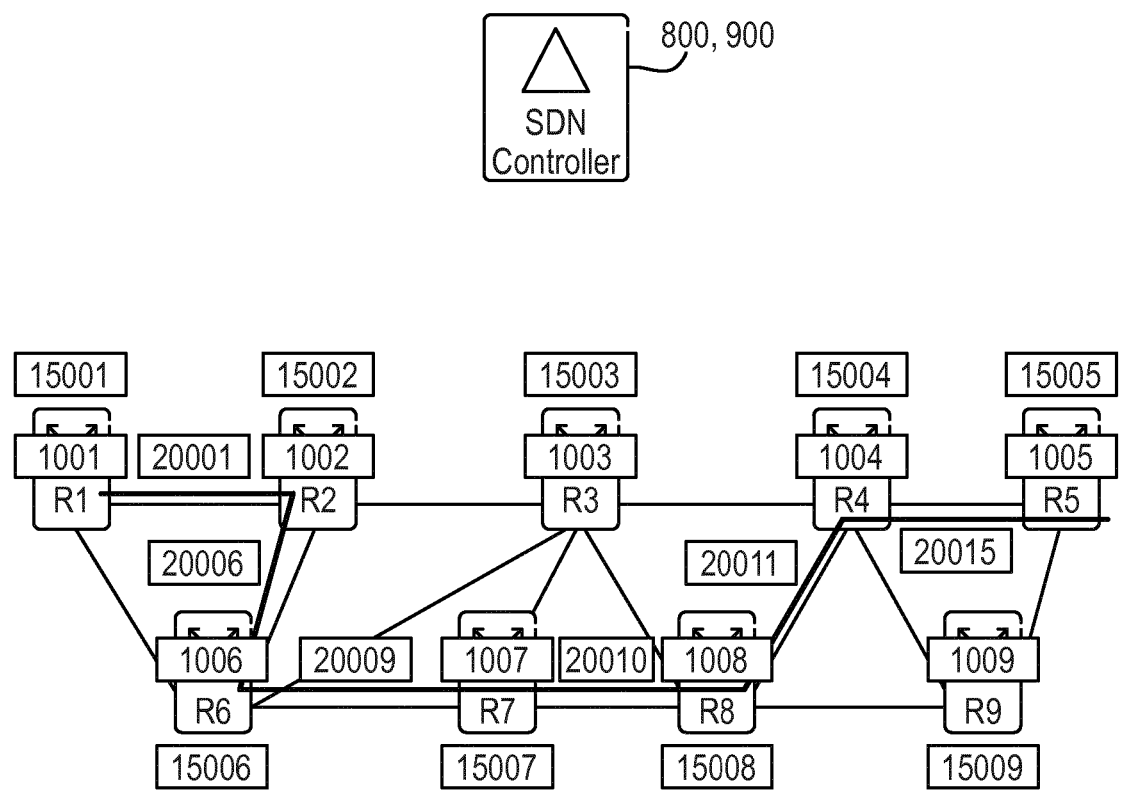
FIG. 4 is a diagram illustrating a network adapted to operate in accordance with embodiments of the method.

The method further comprises encoding, 206, the calculated path as a set of Adjacency Segment Identifiers (Adjacency SIDs). Segment routing is used because it is does not add reservation states to the nodes and hence does not introduce scalability issues. Suppose that the output of the path computation in step 202 for the LSP between R1 and R5 illustrated in FIG. 4 is a path that goes along: R1-R2-R6-R7-R8-R4-R5 and that all nodes along this path support both SR and RSVP-TE, which was checked in operation 204.

Figure 5:
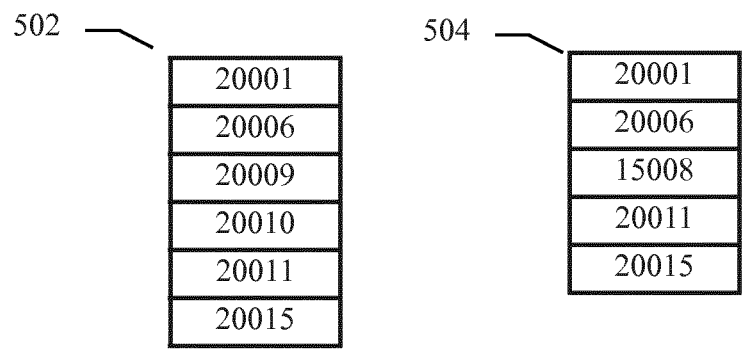
FIG. 5 is a diagram illustrating a label stack in segment routing before and after optimisation.

Node SIDs and Adjacency SIDs are allocated as illustrated in FIG. 4. Allocation of the labels from the RSVP-TE set to nodes R1-R9 is also illustrated in FIG. 4. The encoding of the LSP R1-R2-R6-R7-R8-R4-R5 using adjacency SIDs results in: 20001-20006-20009-20010-20011-20015. The same may be represented graphically as a label stack 502 shown in FIG. 5.

In the following operation the label stack of the calculated path is optimised, 208, by substituting more than one Adjacency SIDs with a Node SID if a partial path identified by the substituted adjacency SIDs equals a shortest path. This results in reducing the depth of the label stack. For example, if in this case the shortest path between R6 and R8 is the one through R7 then the Adjacency SIDs 20009 and 20010 can be substituted with Node SID 15008, reducing the label stack depth by one label and having: 20001-20006-15008-20011-20015. Again, the same may be represented graphically as a label stack 504 shown in FIG. 5.

In a preferred embodiment the optimisation of the label stack can be iterated many times until the shortest possible label stack is reached.

Figure 6:
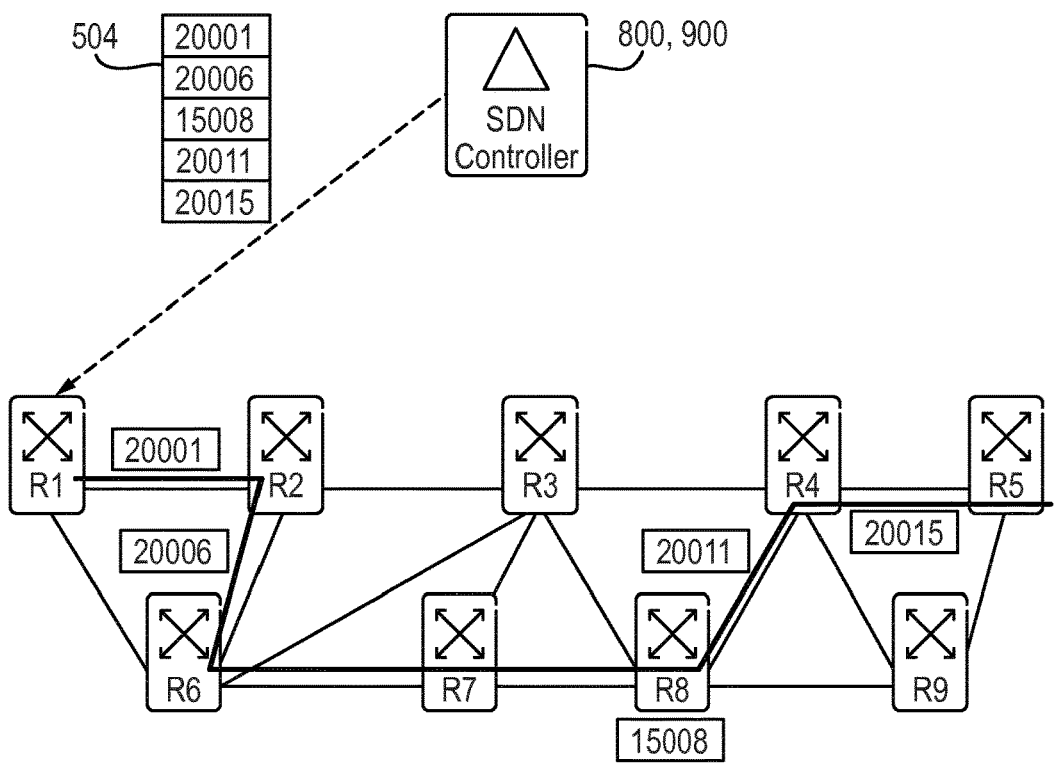
FIG. 6 and FIG. 7 are diagrams illustrating a network operating in accordance with embodiments of the method.

Preferably, once the label stack is optimised the method progresses to checking, 210, if the depth of the optimised label stack is supported by all nodes along the calculated path. If all nodes along the calculated path support label stack depth equal to or deeper than the depth of the optimised label stack, 504, i.e. 5 labels, then the LSP can be setup using segment routing and the SDN controller pushes on the ingress node the optimised label stack and the calculated path is setup using segment routing, as illustrated in FIG. 6. Because the scenario illustrated in FIG. 6 covers Segment Routing the labels from the set allocated to RSVP-TE associated with the nodes R1-R9 are not shown in order to improve clarity. Their allocation has already been shown in FIG. 4.

Figure 7:
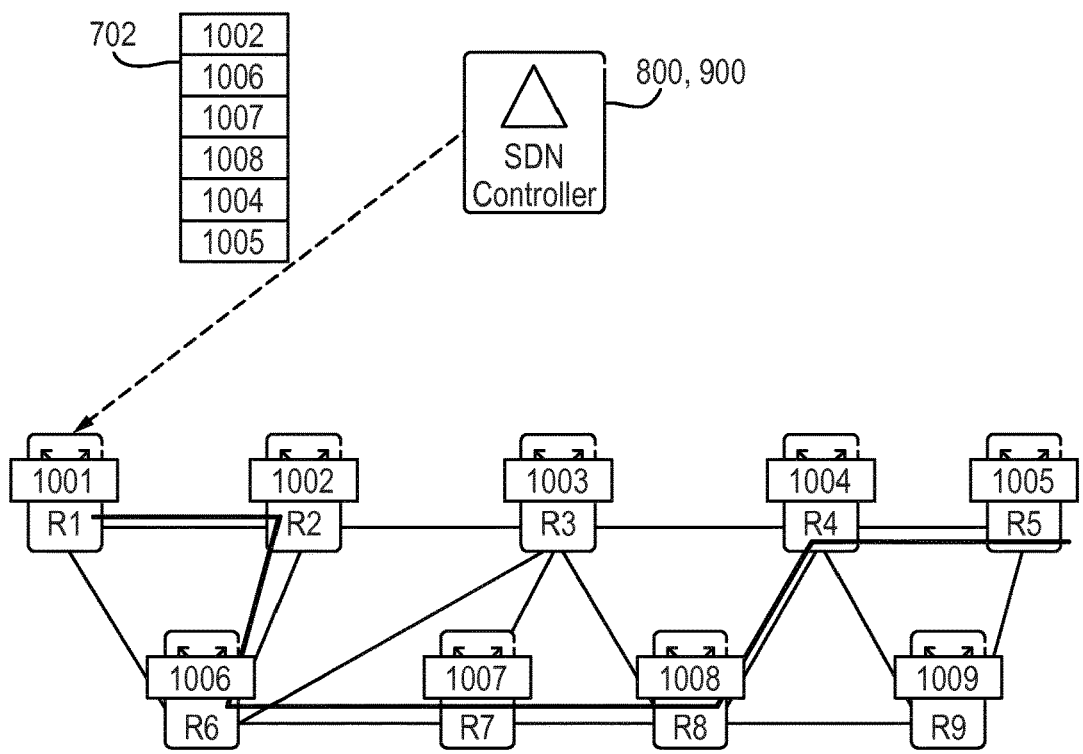

If, however, at least one node along the calculated path does not support a label stack depth at least as deep as the depth of the optimised label stack, 504, then an Explicit Route Object (ERO) is used for signalling the calculated path using RSVP-TE, 214. For, example, if one of the nodes along the calculated path R1-R2-R6-R7-R8-R4-R5 supports SR only up to the label stack depth of 4, then RSVP-TE will be used and the SDN controller will push on the ingress node an ERO, 702, to be used for the signalling via RSVP-TE. An Explicit Route Object specifies the path of an MPLS LSP by using a sequenced list of Label Switching Routers (LSRs) that the LSP must pass through between the ingress and egress LSRs. Because the scenario illustrated in FIG. 7 covers RSVP-TE routing the labels from the set allocated to SR associated with the nodes R1-R9 are not shown in order to improve clarity. Their allocation has already been shown in FIG. 4.

In an alternative embodiment the operation of label stack optimisation is repeated until the label stack depth is reduced enough so that it can be used for SR along the calculated path (this will be known based on information obtained in operation of checking support for both labels stacks at nodes along the calculated path, 204), or until the label stack cannot be reduced any further and then using Explicit Route Object and RSVP-TE, 214, as explained earlier.

As can be appreciated by a person skilled in the art the invention in its embodiments works in such a way that if there is only one node along the path that cannot support the label stack (because the label stack is too deep) the path is setup using RSVP-TE. The advantage is that the more efficient SR is used whenever it is possible.

Preferably the method comprises signalling an ingress node of the network whether to use Segment Routing or RSVP-TE to setup the path using a Path Computation Element Protocol, PCEP, message. The Path Computation Element Protocol is a TCP based communication protocol that enables communications between a Path Computation Element (PCE) and a Path Computation Client (PCC). In this embodiment the ingress node is a PCC.

In an alternative embodiment an ingress node of the network recognises whether to use Segment Routing or RSVP-TE to setup the path based on the range of the labels used in the label stack. This embodiment exploits the fact that there is a clear separation of the labels for SR and RSVP-TE.

Figure 3:
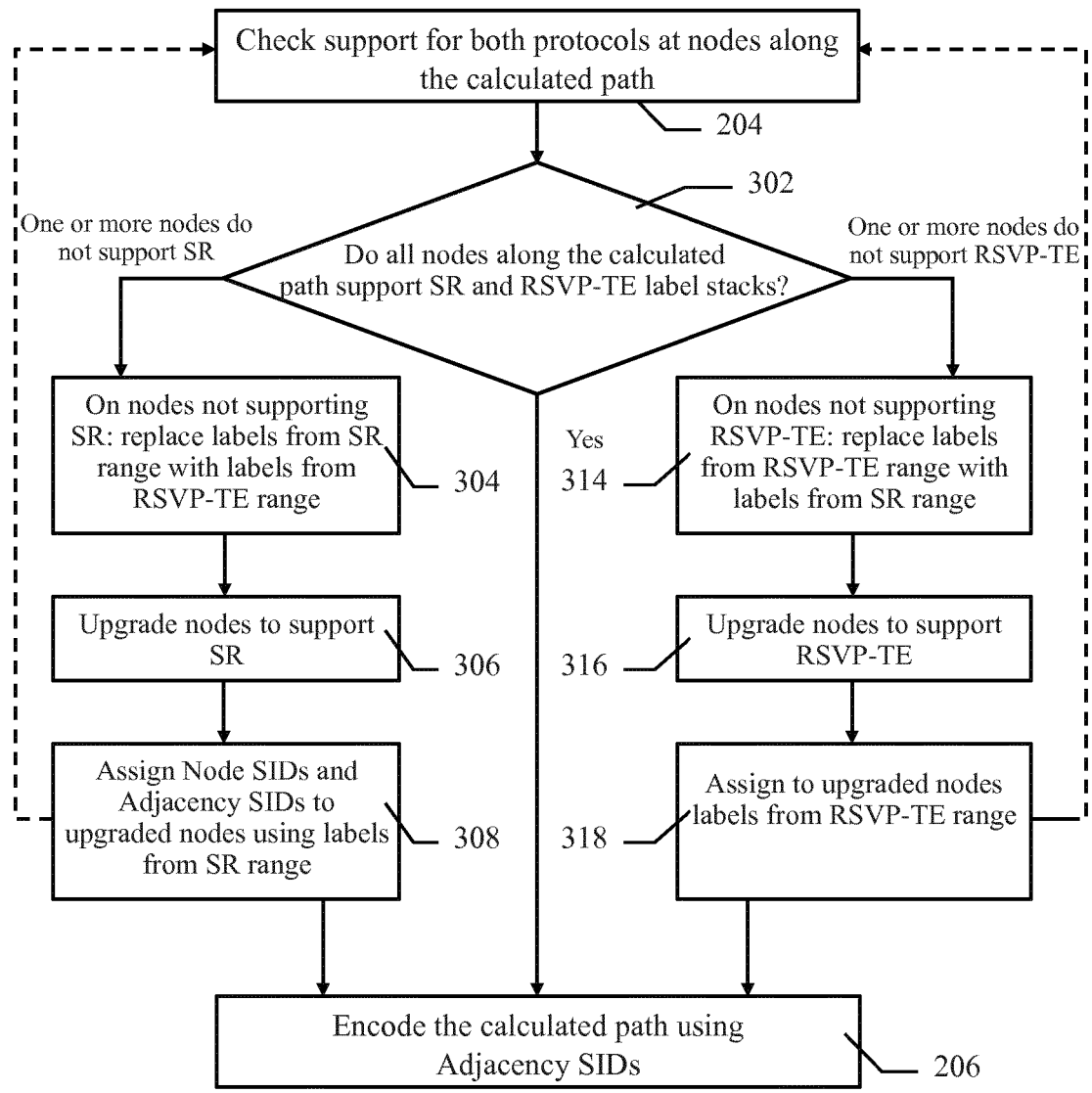
FIG. 3 is a flowchart illustrating a method for routing packet traffic through a network in an alternative embodiment.

It may be that in the step of checking support for both protocols at nodes along the calculated path, 204, it is found that not all nodes support segment routing, 302. It may also be that none of the nodes supports segment routing, 302. In this situation in order to benefit from the advantages of this invention it is necessary to migrate the nodes from RSVP-TE only to hybrid control. This embodiment is illustrated in FIG. 3.

One problem that needs to be solved when trying to migrate nodes in a network to support both SR and RSVP-TE is that for a network in which hybrid control is not implemented the labels assigned by the nodes may not be separated in the way defined to hybrid control. For example nodes supporting RSVP-TE only (i.e. not supporting SR) may be associated with labels belonging to the set allocated for Segment Routing. Therefore the first operation performed is replacing labels, 304, associated with the nodes not supporting Segment Routing, if said labels belong to the set allocated to Segment Routing, with labels from the set allocated to RSVP-TE. After this operation all nodes will be able to use labels from the RSVP-TE set for RSVP-TE routing (e.g. from range 1000 to 15000 which is reserved for RSVP-TE in the example above). In the example above, with labels from range 1000 to 15000 reserved for RSVP-TE, all the LSPs with labels exceeding value 15000 need to be refreshed with a different label value from the RSVP-TE range. This operation should have no impact on traffic forwarding. In the next step, 306, the nodes not supporting Segment Routing are upgraded to support Segment Routing. In one embodiment the upgrade involves installation of software providing SR capabilities, or, alternatively installation of a hardware module configured to perform SR. This operation does not negatively affect the traffic and the operations of the network since the network is still running with RSVP-TE. Finally, the method comprises assigning Node SIDs and Adjacency SIDs 308 to the upgraded nodes using labels belonging to the set allocated to Segment Routing.

After Node SIDs and Adjacency SIDs are assigned to all the nodes and interfaces between the nodes in the network the method, preferably loops back to step 204 and checks if all nodes support both SR and RSVP-TE label stacks, 204, 302. If the answer is "yes" the method moves to step 206 and encodes the calculated path using Adjacency SIDs. Then the method progresses as described with reference to FIG. 2.

In a preferred embodiment in the operation of replacing labels, 304, additionally all labels associated with RSVP-TE are refreshed by replacing them with labels from the set allocated to RSVP-TE. The advantage of this embodiment is that it allows for management of label allocation—for example it allows for separation of RSVP-TE in different network domains—this would be impossible if the labels would be scattered more or less randomly across the range allocated to RSVP-TE.

Finally, as an optional step in the migration from RSVP-TE to hybrid control, it is possible to optimize the network by migrating to segment routing all the RSVP-TE LSPs whose path can be reduced to a number of labels supported by the nodes. This is applicable to migration of a RSVP-TE network to an hybrid one. Once the migration is concluded it is possible to swap a RSVP-TE LSP to a SR LSP in order to improve the scalability of the network.

It may be, however, that in the step of checking support for both label stacks at nodes along the calculated path, 204, it is found that not all nodes support RSVP-TE, 302. It may also be that none of the nodes supports RSVP-TE, 302. In this situation in order to benefit from the advantages of this invention it is necessary to migrate the nodes from Segment Routing only to hybrid control.

As discussed earlier, when trying to migrate nodes in a network to support both SR and RSVP-TE the problem is that for a network in which hybrid control is not implemented the labels assigned by the nodes may not be separated in the way defined to hybrid control. For example nodes supporting Segment Routing only (i.e. not supporting RSVP-TE) may be associated with labels belonging to the set allocated for RSVP-TE. Therefore the first operation performed is replacing labels, 314 associated with the nodes not supporting RSVP-TE, if said labels belong to the set allocated to RSVP-TE, with labels from the set allocated to Segment Routing. After this operation all nodes will be able to use labels from the SR set for Segment Routing (e.g. from range 15001 to 30000 which is reserved for SR in the example above). In the example above, with labels from range 15001 to 30000 reserved for SR, all the LSPs with labels below the value of 15001 need to be refreshed with a label value from the SR range. In the next step, 316, the nodes not supporting RSVP-TE are upgraded to support RSVP-TE. In one embodiment the upgrade involves installation of software providing RSVP-TE capabilities, or, alternatively the upgrade involves installation of a hardware module configured to perform RSVP-TE. Finally, the method comprises assigning labels 318 to the upgraded nodes using labels belonging to the set allocated to RSVP-TE.

In a preferred embodiment in the operation of replacing labels, 314, additionally all labels associated with Segment Routing are refreshed by replacing them with labels from the set allocated to Segment Routing. The advantage of this embodiment is the same as discussed above with reference to refreshing all labels associated with RSVP-TE assigned to nodes in the network—it allows for management of label allocation—for example it allows for separation of SR in different network domains—this would be impossible if the labels would be scattered more or less randomly across the range allocated to SR.

As illustrated in FIG. 3 after the step of assigning respective labels to SR upgraded nodes (step 308) or to RSVP-TE upgraded nodes (step 318) the method preferably progress to the step of encoding the calculated path using Adjacency SIDs, 206.

In an alternative embodiment (marked in dashed lines in FIG. 3), after the step of assigning respective labels to SR upgraded nodes (step 308) or to RSVP-TE upgraded nodes (step 318) the method loops back to the step of checking support for both protocols at nodes along the calculated path, 204. If still some nodes require update then the steps 304-308 or 314-318 are carried out. If all nodes along the calculated path support RSVP-TE protocol and Segment Routing protocol then the method progresses to step 206.

Preferably if the end-to-end path traverses more than one domain then the method according to embodiments of this invention may be applied separately in each of these domains. It could be that in domain 1 RSVP-TE is used and in domain 2 segment routing (SR) is used.

Figure 8:
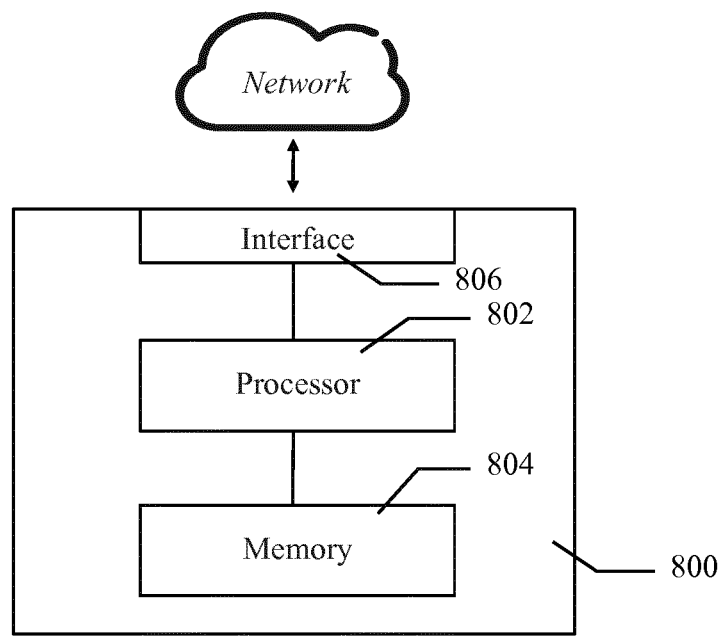
FIG. 8 through to FIG. 11 are diagrams illustrating a controller for controlling routing of packets traffic through a network in various embodiments.

With reference to FIG. 8 an embodiment of a controller for controlling routing of packets traffic through a network adapted to operate in accordance with the method described in this document is now to be described.

Illustrated in FIG. 8 is one embodiment of the controller, 800, for controlling routing of packet traffic through a network. The network comprises a plurality of network nodes supporting RSVP-TE protocol and Segment Routing protocol, wherein each of the two protocols is associated with a separate set of labels. The controller, 800, comprises a processor, 802, and a memory, 804. Said memory contains instructions executable by said processor, 802, whereby said controller in operation is operative to calculate a path through the network. Calculating a path between two nodes in a network is well known in the art and will not be described in this document. The controller, 800, is further operable to check support for both protocols at nodes along the calculated path. As explained earlier in description of embodiments of the method, in a preferred embodiment, the checks include checking if both protocols are supported by all nodes along the calculated path and checking the depth of the label stacks supported in Segment Routing at individual nodes. Alternatively, in a newly deployed network with dual stack nodes (RSVP-TE and SR) it may be that only the depth of the label stacks supported at individual nodes in SR is being checked. The controller, 800, is adapted to encode the calculated path as a set of Adjacency Segment Identifiers and then to optimise a label stack of the calculated path by substituting more than one adjacency SIDs with a node SID if a partial path identified by the substituted adjacency SIDs equals a shortest path. The optimisation leads to reduction of the label stack's depth, which may be necessary if the original labels stack is too deep to be processed by nodes (or at least one node) along the calculated path. If all nodes along the calculated path support label stack depth equal to or deeper than the depth of the optimised label stack then the controller, 800, is operative to setup the calculated path using segment routing and the optimised label stack. Using SR for routing packets is preferred and this is why the controller first attempts to use SR by optimising the label stack. Sometimes, however, the calculated path may be too long and even multiple rounds of optimisation fail to reduce the label depth to a value that is supported by each node along the calculated path. In these situations, if a node along the calculated path does not support a label stack equal to or deeper than the depth of the optimised label stack, the controller is operative to use an Explicit Route Object for signalling the calculated path using RSVP-TE.

In an alternative embodiment the controller repeats the label stack optimisation until the label stack depth is reduced enough so that it can be used for SR along the calculated path, or until the label stack cannot be reduced any further and then using Explicit Route Object and RSVP-TE, 214, as explained in the description of embodiment of the method. For example, a function within the controller 800 responsible for optimising the label stack may know from operation 204 that label stack depth of 5 is enough to use SR and stops optimisation when the label stack reaches 5 and the controller 800 instructs the ingress node to use SR is used. Alternatively, if label depth of 5 cannot be reached despite optimisation attempts the ERO+RSVP-TE is used.

In the following description it is assumed that the set of labels allocated to RSVP-TE ranges from 1000 to 15000 and the set of labels allocated for Segment Routing ranges from 15001 to 30000.

Preferably, for communication between the controller 800 and network nodes a Path Computation Element Protocol, PCEP, and a communication interface, 806, are used. A PCEP message is sent to signal an ingress node of the network whether to use Segment Routing or RSVP-TE to setup the path. The PCEP protocol has been briefly discussed earlier, with reference to embodiments of the method. PCEP is also used by the ingress node when requesting a path to be calculated to a remote destination node. Using PCEP for instructing the ingress node which routing protocol to use is a preferred way as PCEP is a well-established and standardised, but there are available other methods of detecting by the ingress node whether to use SR or RSVP-TE. For example, as explained in the description of embodiments of the method, the ingress node may recognise the range of labels in the received label stack and if the labels in the stack belong to the SR set of labels then Segment Routing is used, in contrast, if the labels in the stack belong to RSVP-TE set the RSVP-TE is used.

When checking support for both protocols at nodes along the calculated path, shows that not all nodes support segment routing then in order to benefit from the advantages of this invention it is necessary to migrate the nodes from RSVP-TE only to hybrid control. In this embodiment the controller, 800, is operative to replace labels associated with the nodes which do not support Segment Routing with labels from the set allocated to RSVP-TE. Replacing of the labels in this embodiment is performed if the original labels belong to the set allocated to Segment Routing. If, however, the original labels belong to the set allocated to RSVP-TE they will not be replaced. Once the nodes which do not support SR, but only RSVP-TE have labels only from the RSVP-TE set the controller 800 is operative to cause an upgrade of the nodes not supporting Segment Routing to support Segment Routing and then assign Node SIDs and Adjacency SIDs to the upgraded nodes. The Node SIDs and Adjacency SIDs assigned by the controller 800 belong to the Segment Routing set of labels.

Alternatively, when checking support for both protocols at nodes along the calculated path shows that not all nodes support RSVP-TE then in order to benefit from the advantages of this invention it is necessary to migrate the nodes from SR only to hybrid control. In this embodiment the controller 800 is operative to replace labels associated with the nodes which do not support RSVP-TE, if said labels belong to the set allocated to RSVP-TE, with labels from the set allocated to Segment Routing. Once the label are in order (i.e. there are no labels from the RSVP-TE set assigned to nodes supporting only Segment Routing) the controller causes upgrade of the nodes not supporting RSVP-TE to support RSVP-TE and after that the controller, 800, is operative to assign labels to the upgraded nodes using labels belonging to the set allocated to RSVP-TE.

Figure 9:
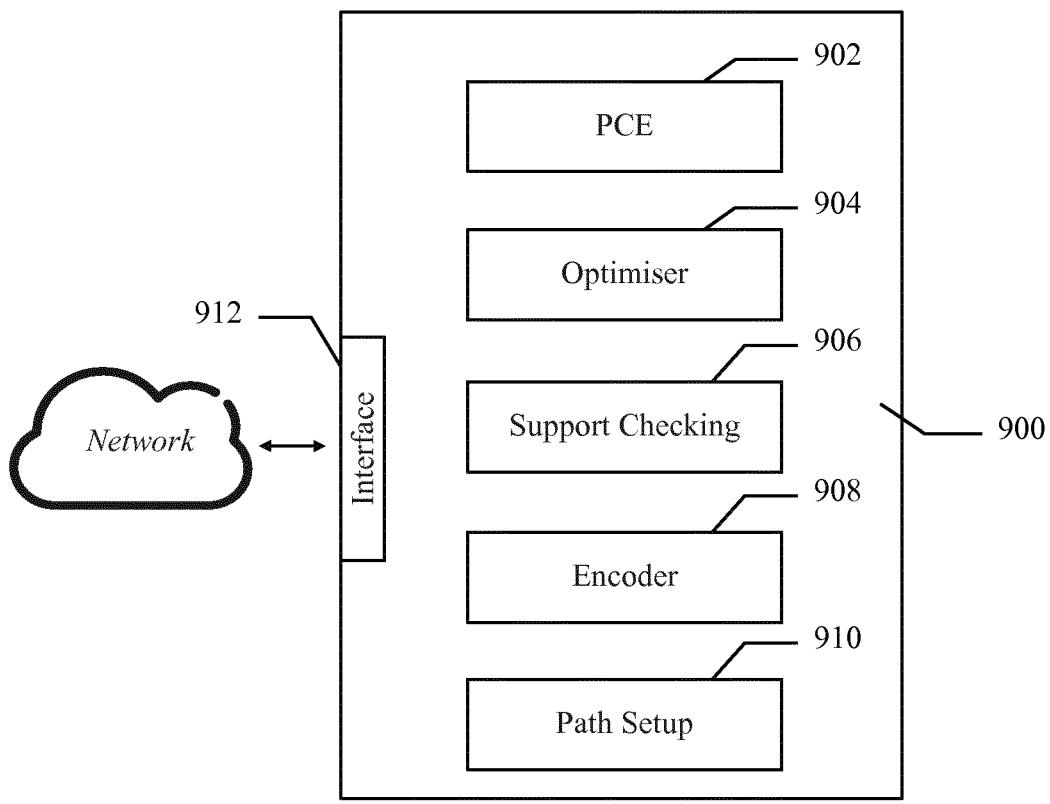
Figure 10:
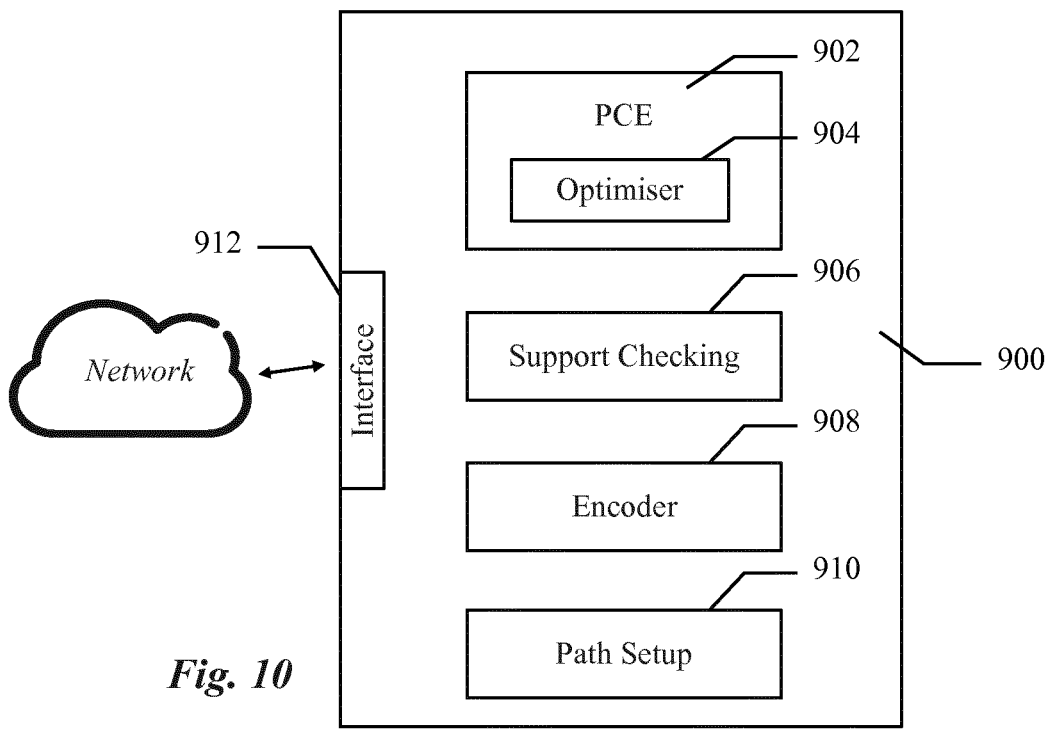

Illustrated in FIG. 9 is another embodiment of the controller for controlling routing of packet traffic through a network comprising a plurality of network nodes supporting RSVP-TE protocol and Segment Routing protocol. In this embodiment, similar the previous embodiments, each of the two protocols is associated with a separate set of labels. The controller, 900, comprises a Path Computation Engine (PCE), 902, sometimes called Paten Calculation Engine, which calculates a path through the network and means for checking support for both protocols, 906, at nodes along the calculated path. The means for checking support 906 may be implemented as a database storing configuration information about the network elements deployed in the network and operable to answer to a request for this information from the PCE 902. Alternatively the means for checking support 906 may be a function (implemented in software or in hardware) that actively interrogates network elements along the calculated path about their configuration details (including supported routing protocols). The controller 900 further comprises encoding means, 908, for encoding the calculated path as a set of Adjacency Segment Identifiers and means for setting up the calculated path, 910. Again these may be implemented as a software functions. Further, the controller comprises an optimiser, 904, for optimising a label stack of the calculated path by substituting more than one adjacency SIDs with a node SID if a partial path identified by the substituted adjacency SIDs equals a shortest path. In one embodiment the optimiser may be a discrete function as shown in FIG. 9 and in an alternative embodiment the optimiser 904 may be integrated in the PCE 902, as illustrated in FIG. 10. If all nodes along the calculated path support label stack depth equal to or deeper than the depth of the optimised label stack then the means for setting-up the calculated path, 910, is operative to use segment routing and the optimised label stack for setting-up the calculated path and if at least one node along the calculated path does not support a label stack equal to or deeper than the depth of the optimised label stack then the means for setting-up the calculated path, 910, is operative to use an Explicit Route Object for signalling the calculated path using RSVP-TE.

Preferably the optimiser 904 is operative to repeat the operation of optimising the label stack in order to reduce the label stack depth and enable the use of Segment Routing. Sometimes, however, the calculated path may be too long and even multiple rounds of optimisation fail to reduce the label depth to a value that is supported by each node along the calculated path. In these situations, if a node along the calculated path does not support a label stack equal to or deeper than the depth of the optimised label stack, the controller, 900, uses an Explicit Route Object for signalling the calculated path using RSVP-TE.

In an alternative embodiment the optimiser 904 repeats the label stack optimisation until the label stack depth is reduced enough so that it can be used for SR along the calculated path, or until the label stack cannot be reduced any further and then using Explicit Route Object and RSVP-TE as explained in the description of embodiment of the method. For example, the optimiser may know from the means for checking support 906 that label stack depth of 5 is enough to use SR and stops optimisation when the label stack reaches 5 and then SR is used. Alternatively, if label depth of 5 cannot be reached despite optimisation attempts the ERO+RSVP-TE is used.

Preferably, for communication between the controller 900 and network nodes a Path Computation Element Protocol, PCEP, and a communication interface, 912, are used. A PCEP message is used to signal an ingress node of the network whether to use Segment Routing or RSVP-TE to setup the path.

Figure 11:
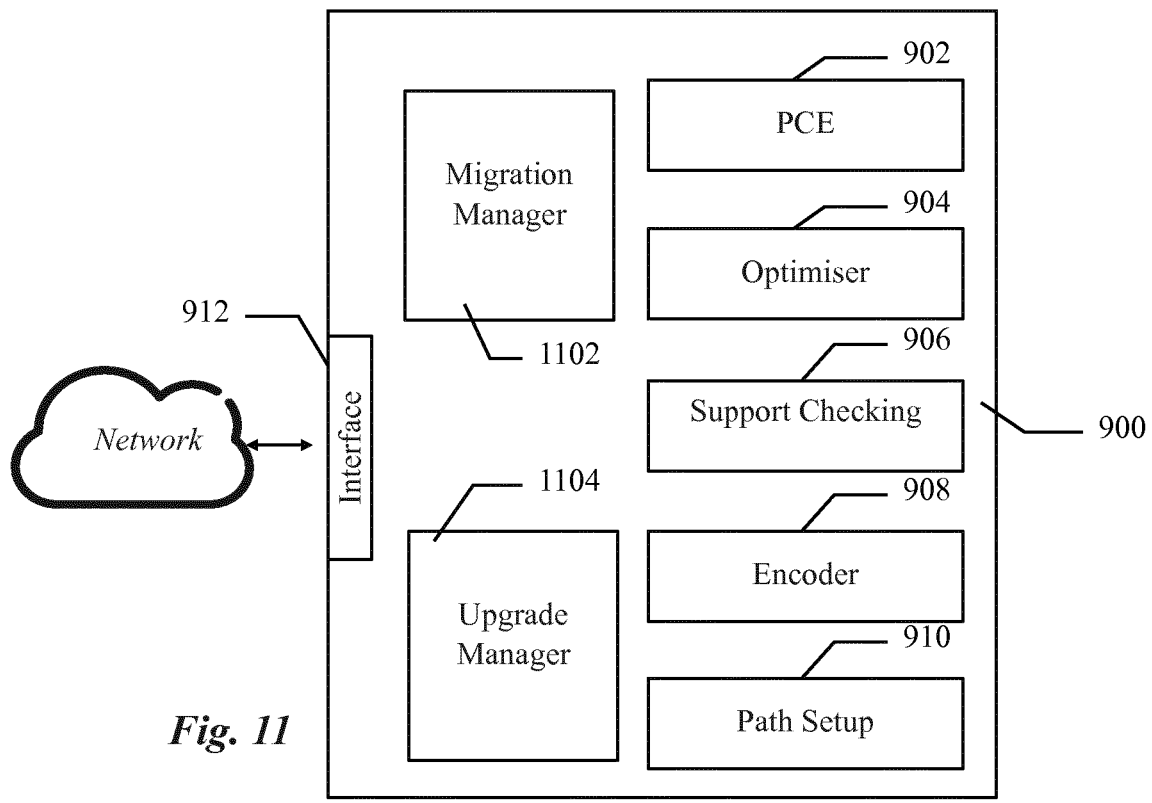

When the Support Checking Function 906 reports that not all nodes along the calculated path support segment routing then in order to benefit from the advantages of this invention it is necessary to migrate the nodes from RSVP-TE only to hybrid control. In one embodiment, illustrated in FIG. 11, the controller 900 further comprises a Migration Manager 1102 for replacing labels associated with the nodes which do not support Segment Routing, if said labels belong to the set allocated to Segment Routing. In this situation the labels are replaced with labels from the set allocated to RSVP-TE. The controller 900 further comprises an Upgrade Manager, 1104, for causing upgrade of the nodes not supporting Segment Routing to support Segment Routing. The Upgrade Manager is operable to send software upgrade packages to nodes that need upgrading to support SR and also sends instruction that initiates the upgrade. The instruction from the Upgrade Manager 1104 may contain a condition that needs to be met before the upgrade starts. The Migration Manager, 1102, after the upgrade to SR is completed assigns Node SIDs and Adjacency SIDs to the upgraded nodes using labels belonging to the set allocated to Segment Routing.

Alternatively, when the Support Checking Function 906 reports that not all nodes along the calculated path support RSVP-TE then in order to benefit from the advantages of this invention it is necessary to migrate the nodes from SR only to hybrid control. In this embodiment the Migration Manager 1102 replaces labels associated with the nodes which do not support RSVP-TE, if said labels belong to the set allocated to RSVP-TE, with labels from the set allocated to Segment Routing. Once the label are in order (i.e. there are no labels from the RSVP-TE set assigned to nodes supporting only Segment Routing) the Upgrade Manager 1104 causes upgrade of the nodes not supporting RSVP-TE to support RSVP-TE. The Upgrade Manager is operable to send software upgrade packages to nodes that need upgrading to support RSVP-TE and also sends instruction that initiates the upgrade. The instruction from the Upgrade Manager 1104 may contain a condition that needs to be met before the upgrade starts. The condition may be, for example, that there is required amount of available memory in the node to be upgraded. The Migration Manager, 1102, after the upgrade to RSVP-TE is completed assigns labels to the upgraded nodes using labels belonging to the set allocated to RSVP-TE.

In a preferred embodiment the controller 800 or 900 is an SDN controller.

One of the important advantages of the embodiments of the invention is that it allows increasing the number of nodes and LSPs supported by a Traffic Engineered network by offloading to segment routing all the LSPs that require a shallow enough label stack. Decreasing the number of LSPs that require a state installation and refresh on the nodes is a key enabler for scalability improvements. At the same time the invention allows for having arbitrarily long LSPs in a network where segment routing would not be able to reach too far destinations with Traffic Engineering constraints. And in addition to that, the invention in its various embodiments can be deployed without any traffic hit on existing networks.

Acronyms Used

BGP—Border Gateway Protocol
ECMP—Equal-Cost Multi-Path
ERO—Explicit Route Object
FIB—Forwarding Information Base
GMPLS—Generalised Multiprotocol Label Switching
IGP—Interior Gateway Protocol
IP—Internet Protocol
IS-IS—Intermediate System to Intermediate System
LDP—Label Distribution Protocol
LSP—Label Switched Path
LSR—Label Switch Router MPLS—Multiprotocol Label Switching
OSPF—Open Shortest Path First
PCC—Path Computation Client
PCE—Path Computation Engine
PCEP—Path Computation Element Protocol
RSVP—Resource Reservation Protocol
SDN—Software Defined Networking
SID—Segment Identifier
SR—Segment Routing
TCP—Transmission Control Protocol
TE—Traffic Engineering

The invention claimed is:

1. A method for routing packet traffic through a network comprising a plurality of network nodes, the nodes supporting Resource Reservation Protocol—Traffic Engineering (RSVP-TE) protocol and Segment Routing protocol, wherein each of the two protocols is associated with a separate set of labels, the method comprising:
calculating a path through the network;
checking support for both protocols at nodes along the calculated path;
encoding the calculated path as a set of Adjacency Segment Identifiers;
optimizing a label stack of the calculated path by substituting more than one adjacency Segment Identifier (SIDs) with a node SID if a partial path identified by the substituted adjacency SIDs equals a shortest path; and
if all nodes along the calculated path support label stack depth equal to or deeper than the depth of the optimized label stack, then the calculated path is set up using segment routing and the optimized label stack; and
if a node along the calculated path does not support a label stack depth equal to or deeper than the depth of the optimized label stack, then an Explicit Route Object is used for signaling the calculated path using RSVP-TE.

2. The method of claim 1, wherein the optimizing the label stack is repeated until the label stack depth is reduced enough so that it can be used for Segment Routing along the calculated path, or until the label stack cannot be reduced any further.

3. The method of claim 1, further comprising signaling an ingress node of the network whether to use Segment Routing or RSVP-TE to setup the path using a Path Computation Element Protocol message.

4. The method of claim 1, wherein an ingress node of the network recognizes whether to use Segment Routing or RSVP-TE to set up the path based on the range of the labels used in the label stack.

5. The method of claim 1, wherein, if one or more nodes in the network do not support Segment Routing, the method comprises:
replacing labels associated with the nodes not supporting Segment Routing, if the labels belong to the set allocated to Segment Routing, with labels from the set allocated to RSVP-TE;
upgrading the nodes not supporting Segment Routing to support Segment Routing; and
assigning Node SIDs and Adjacency SIDs to the upgraded nodes using labels belonging to the set allocated to Segment Routing.

6. The method of claim 5, wherein, in the replacing labels, all labels associated with RSVP-TE are refreshed by replacing the all labels associated with RSVP-TE with labels from the set allocated to RSVP-TE.

7. The method of claim 1, wherein, if one or more nodes in the network do not support RSVP-TE, the method comprises:
replacing labels associated with the nodes not supporting RSVP-TE, if the labels belong to the set allocated to RSVP-TE, with labels from the set allocated to Segment Routing;
upgrading the nodes not supporting RSVP-TE to support RSVP-TE; and
assigning labels to the upgraded nodes using labels belonging to the set allocated to RSVP-TE.

8. The method of claim 7, wherein, in the replacing labels, all labels associated with Segment Routing are refreshed by replacing the all labels associated with Segment Routing with labels from the set allocated to Segment Routing.

9. A controller for controlling routing of packet traffic through a network, the network comprising a plurality of network nodes, the nodes supporting Resource Reservation Protocol—Traffic Engineering (RSVP-TE) protocol and Segment Routing protocol, wherein each of the two protocols is associated with a separate set of labels, the controller comprising:
processing circuitry;
memory containing instructions executable by the processing circuitry whereby the controller is operative to:
calculate a path through the network;
check support for both protocols at nodes along the calculated path;
encode the calculated path as a set of Adjacency Segment Identifiers;
optimize a label stack of the calculated path by substituting more than one adjacency Segment Identifier (SIDs) with a node SID if a partial path identified by the substituted adjacency SIDs equals a shortest path; and
if all nodes along the calculated path support label stack depth equal to or deeper than the depth of the optimized label stack, set up the calculated path using segment routing and the optimized label stack;
if a node along the calculated path does not support a label stack equal to or deeper than the depth of the optimized label stack, use an Explicit Route Object for signaling the calculated path using RSVP-TE.

10. The controller of claim 9, wherein the instructions are such that the controller is operative to repeat the optimizing the label stack until the label stack depth is reduced enough so that it can be used for Segment Routing along the calculated path, or until the label stack cannot be reduced any further.

11. The controller of claim 9, wherein the instructions are such that the controller is operative to use a Path Computation Element Protocol message to signal an ingress node of the network whether to use Segment Routing or RSVP-TE to set up the path.

12. The controller of claim 9, wherein the instructions are such that the controller is operative to, if one or more nodes in the network do not support Segment Routing:
replace labels associated with the nodes not supporting Segment Routing, if the labels belong to the set allocated to Segment Routing, with labels from the set allocated to RSVP-TE;
cause upgrade of the nodes not supporting Segment Routing to support Segment Routing; and
assign Node SIDs and Adjacency SIDs to the upgraded nodes using labels belonging to the set allocated to Segment Routing.

13. The controller of claim 9, wherein the instructions are such that the controller is operative to, if one or more nodes in the network do not support RSVP-TE:

replace labels associated with the nodes not supporting RSVP-TE, if the labels belong to the set allocated to RSVP-TE, with labels from the set allocated to Segment Routing;

cause upgrade of the nodes not supporting RSVP-TE to support RSVP-TE; and assign labels to the upgraded nodes using labels belonging to the set allocated to RSVP-TE.

14. A controller for controlling routing of packet traffic through a network comprising a plurality of network nodes, the nodes supporting Resource Reservation Protocol—Traffic Engineering (RSVP-TE) protocol and Segment Routing protocol, wherein each of the two protocols is associated with a separate set of labels, the controller comprising:

calculating circuitry configured to calculate a path through the network;

circuitry configured to check support for both protocols at nodes along the calculated path;

encoding circuitry configured to encode the calculated path as a set of Adjacency Segment Identifiers;

optimizing circuitry configured to optimize a label stack of the calculated path by substituting more than one adjacency Segment Identifier (SIDs) with a node SID if a partial path identified by the substituted adjacency SIDs equals a shortest path; and circuitry configured to set-up the calculated path, wherein the circuitry configured to set-up the calculated path is operative to:

if all nodes along the calculated path support label stack depth equal to or deeper than the depth of the optimized label stack, use segment routing and the optimized label stack for setting-up the calculated path; and if a node along the calculated path does not support a label stack equal to or deeper than the depth of the optimized label stack, use an Explicit Route Object for signaling the calculated path using RSVP-TE.

15. The controller of claim 14, wherein the optimizing circuitry is configured to repeat the operation of optimizing the label stack until the label stack depth is reduced enough so that it can be used for Segment Routing along the calculated path, or until the label stack cannot be reduced any further.

16. The controller of claim 14, wherein the controller is operative to use a Path Computation Element Protocol message to signal an ingress node of the network whether to use Segment Routing or RSVP-TE to set-up the path.

17. The controller of claim 14, further comprising:

circuitry configured to replace labels associated with the nodes not supporting Segment Routing, if the labels belong to the set allocated to Segment Routing, with labels from the set allocated to RSVP-TE;

circuitry configured to cause upgrading of the nodes not supporting Segment Routing to support Segment Routing; and circuitry configured to assign Node SIDs and Adjacency SIDs to the upgraded nodes using labels belonging to the set allocated to Segment Routing.

18. The controller of claim 14, further comprising:

circuitry configured to replace labels associated with the nodes not supporting RSVP-TE, if the labels belong to the set allocated to RSVP-TE, with labels from the set allocated to Segment Routing;

circuitry configured to cause upgrading of the nodes not supporting RSVP-TE to support RSVP-TE; and circuitry configured to assign labels to the upgraded nodes using labels belonging to the set allocated to RSVP-TE.

* * * * *